(No Model.)  2 Sheets—Sheet 1.

H. LIEBERICH.
FILTER.

No. 491,574.  Patented Feb. 14, 1893.

Witnesses:
E. B. Bolton
H. Palmer

Inventor:
Heinrich Lieberich
By Richards
his Attorneys (No Model.) 2 Sheets—Sheet 2.

H. LIEBERICH.
FILTER.

No. 491,574. Patented Feb. 14, 1893.

Witnesses:
E. B. Bolton
H. Palmer

Inventor:
Heinrich Lieberich
By Richardson
his Attorneys.

UNITED STATES PATENT OFFICE.

HEINRICH LIEBERICH, OF NEUSTADT, GERMANY.

FILTER.

SPECIFICATION forming part of Letters Patent No. 491,574, dated February 14, 1893.

Application filed May 9, 1892. Serial No. 432,277. (No model.) Patented in Germany August 4, 1891, No. 61,994, and in France September 28, 1891, No. 216,399.

*To all whom it may concern:*

Be it known that I, HEINRICH LIEBERICH, a subject of the King of Bavaria, residing at Neustadt, in Rhenish Bavaria, Germany, have invented certain Improvements in Filters, (for which I obtained Letters Patent in Germany, dated August 4, 1891, No. 61,994, and in France, dated September 28, 1891, No. 216,399,) of which the following is a specification.

This invention has reference to certain improvements in filters, and is designed to secure a sufficient filtering operation by maintaining the filtering material in a uniform condition.

Figure 1:
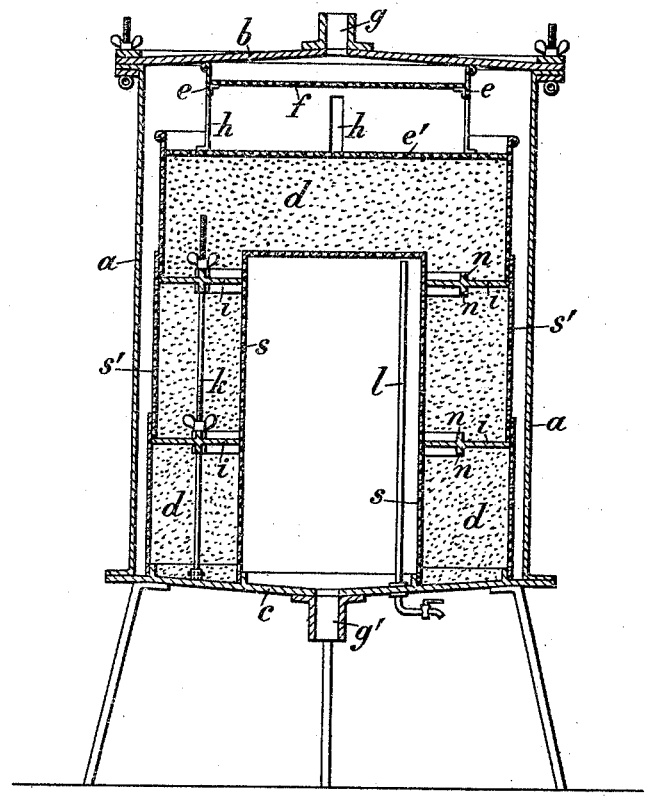
Figure 2:
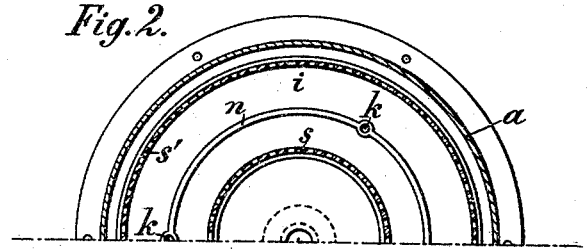
Figure 3:
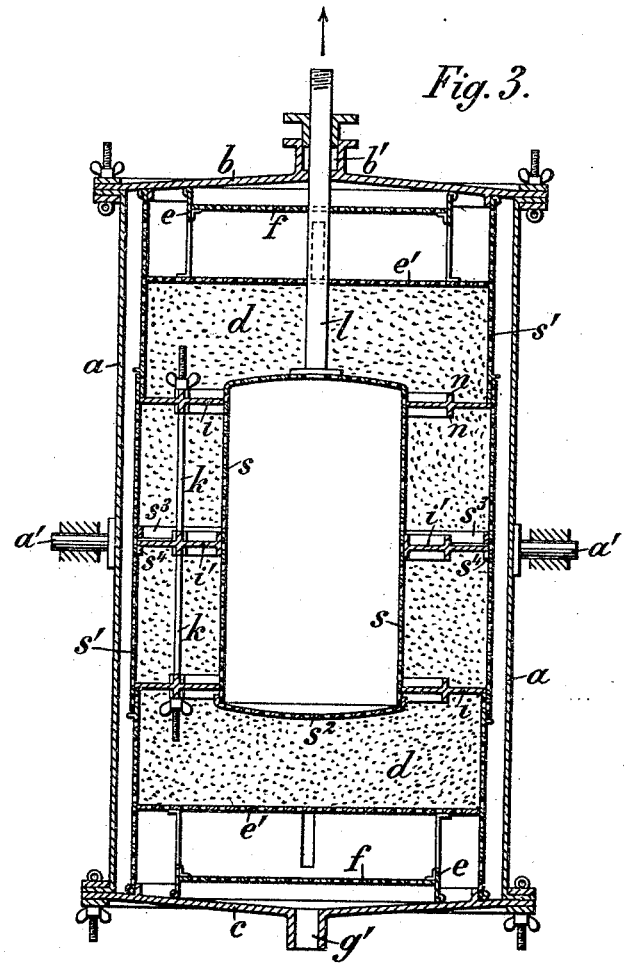
Figure 4:
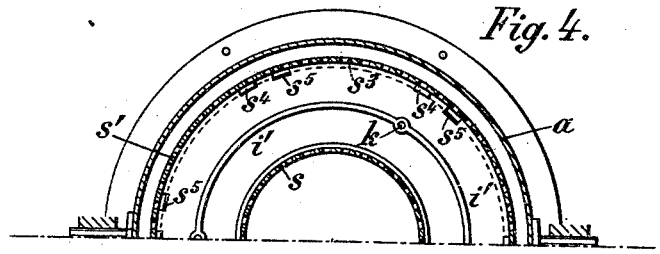

In the accompanying drawings, forming part of this specification, Figure 1 shows my improved filter in vertical section. Fig. 2 is a detail sectional view, taken in a horizontal plane. Fig. 3 is a vertical sectional view illustrating my improvements embodied in a swinging or reversible filter. Fig. 4 is a detail sectional view taken centrally in the horizontal plane of Fig. 3.

To secure an even filtration of liquids, a prime requirement is that the filtering substance be of a uniform density throughout its surface. To secure this result, however, serious difficulties have to be overcome because the character of the filtering material is such that its particles become united and caked, resulting in an uneven condition of the filtering material, affording greater resistance to the percolation of liquid at some points than at others. Moreover, the sediment lodges to a greater degree at some points than at others. By my improvements I overcome the foregoing objections, and secure a highly even filtering operation.

$a$ is a vertical cylinder closed at both ends by heads $b$ and $c$, and supported upon legs.

$d$ is a filtering drum within the cylinder, and containing the filtering material. This filtering drum $d$ has its open end secured to the head $c$, and contains a smaller cylinder $s$, the lower open end of which is also connected to the head $c$. The body of the drum $d$ is made up of a series of sections $s'$, and is surmounted by a cover comprising a ring $e$ and perforated plate $e'$, the latter forming the closed end of the drum $d$. The perforated plate $f$ is supported upon the ring $e$, and divides the liquid entering through the tube $g$. The flow of the liquid is further divided by means of slot $h$ in the ring $e$.

The filtering material is contained within the drum $d$, and surrounds the central cylinder $s$. To divide the filtering material in an equal manner, several horizontal annular plates $i\ i$ are provided; are supported in position by vertical rods $k$, the lower ends of which are permanently secured to the head $c$; said rods passing through the annular plates $i\ i$, and terminating in threaded portions engaging clamp nuts. These annular plates enable the filtering material to be divided in equal layers to admit of varying layers of different material being employed. By turning the thumb nuts the annular plates can be operated to compress the several layers of material and bring the same to an equal condition of density.

The annular plates $i\ i$ are provided with upper and lower vertical ribs $n\ n$, which serve as barriers to the free entrance of the liquid to the filtered water chamber, without passing through the filtering material, as might otherwise happen on the settling of the filtering material or the formation of channels along the upper surfaces of the division plates.

$g'$ is the discharge for conveying the filtered water from the central cylinder $s$. $l$ is a ventilating tube communicating with the interior of said cylinder and permits the escape of air from the same when the filtered water discharged through $g'$ is to be conveyed to the receptacle located at a higher point than the filtering apparatus.

With the view of effecting the ready detachment of the parts, the middle annular plate $i'$, Fig. 3, is preferably connected with the central cylindrical section $s'$, by a detachable connection. A ring $s^3$ secured to the inner side of the section $s'$ limits the upward movement of the plate $i$ and lugs $s^4$ beneath serve to support the plate until the plate is turned to cause its recessed portions $s^5$ to register therewith when the plate may be detached. Obviously as many annular plates may be employed as filtering layers may be required.

The arrangement of the filters represented in Figs. 3 and 4, has the preference over that shown in Figs. 1 and 2, since the surface of the filter is far greater, so that with this arrangement, a far greater effect is secured from the filter. At the same time this arrangement has the advantage that the liquid to be filtered, can be introduced either from above or below as desired, and the filtrate may be conducted out of it from below or above respectively. There are here, as described above, arranged two bell shaped filtering drums with their bases lying against each other, and forming together a symmetrical double filtering-drum, this being closed at both sides by perforated heads $f$. Both halves of this double filtering drum $d$, are separated from each other by an annular plate $i$, and to this plate are fastened the rods $k$, which project above and below for the attachment of the pressing plates $i$. The ventilation pipe $l$, serves here at the same time also for conveying away the filtered liquid. This pipe is fastened to one end of the inner sieve-casing $s$, and passes out through a stuffing box $b'$, attached to the cover $b$, of the tank $a$. The tank $a$, is provided with two cylindrical trunnions $a'$, in the middle of its periphery, and by means of these trunnions is placed on a frame (not represented) so as to be capable of turning.

The liquid to be filtered is always introduced through the pipes $g'$, into the filter from below under pressure, with the position of the filter shown in Fig. 3, and surrounds the filtering drum on all sides. The filtrate collects in the inner part of the sieve casing $s$, and displaces the air contained in the same, the more it fills this frame. The air escapes through the pipe $l$, and is finally entirely emptied through this pipe. If it is desired to introduce the liquid from above, and to take it away from below, the filter, has only to be turned through an angle of one hundred and eighty degrees.

I claim:—

1. In combination in a filter, of a casing containing the filtering drum, an inner cylinder for filtered water, a series of annular imperforate compression plates encircling the inner cylinder, an ingress opening and a ring $e$ having a perforated head and vertical slots $h$, substantially as described.

2. The combination in a filter of a casing containing the filtering drum, an inner cylinder for filtered water intermediate compression plates for dividing the filtered material into independent layers, and an ingress opening at the upper end of the casing, and a ring $e$ having a perforated head located on the drum and provided with vertical slots $h$, substantially as set forth.

3. The combination in a filter of a casing containing the filtering drum with a space between the two, an inner water chamber, a series of annular imperforate compression plates encircling the water chamber, ribs projecting from the upper and lower sides of the partitions, an ingress opening and a ring $e$ having a perforated head and vertical slots $h$, substantially as described.

In witness whereof I have hereunto signed my name in presence of two subscribing witnesses.

HEINRICH LIEBERICH.

Witnesses:
GUSTAV SIEGEL,
FRED. BOPP.